United States Patent [19]

Lyon

[11] 3,716,320
[45] Feb. 13, 1973

[54] APPARATUS FOR PRODUCING FLAT FILM FROM THERMOPLASTIC MATERIAL

[75] Inventor: John B. Lyon, Buffalo, N.Y.

[73] Assignee: E. I. du Pont de Nemours and Company, Wilmington, Del.

[22] Filed: Nov. 23, 1970

[21] Appl. No.: 92,223

Related U.S. Application Data

[63] Continuation of Ser. No. 234,398, Oct. 31, 1962, abandoned.

[52] U.S. Cl. ................................................. 425/326
[51] Int. Cl. ............................................ B29d 23/00
[58] Field of Search ..................................... 425/326

[56] References Cited

UNITED STATES PATENTS

| | | | |
|---|---|---|---|
| 2,987,767 | 6/1961 | Berry et al. | 425/326 X |
| 3,412,189 | 11/1968 | Sullivan | 425/384 X |

FOREIGN PATENTS OR APPLICATIONS

| | | | |
|---|---|---|---|
| 643,991 | 10/1950 | Great Britain | 251/25 |

Primary Examiner—J. Spencer Overholser
Assistant Examiner—John E. Roethel
Attorney—Herbert M. Wolfson

[57] ABSTRACT

An apparatus for producing flat film from thermoplastic material wherein an expandable cylindrical collar in combination with a pressure relief valve is positioned between the expansion area and the quenching area. The collar prevents the expansion gas from leaking into the quenching and extruding area of the apparatus.

3 Claims, 3 Drawing Figures

PATENTED FEB 13 1973

3,716,320

INVENTOR
JOHN B. LYON

BY Herbert M. Wolfson
ATTORNEY

APPARATUS FOR PRODUCING FLAT FILM FROM THERMOPLASTIC MATERIAL

This application is a continuation of Ser. No. 234,398, filed Oct. 31, 1962, now abandoned.

This invention relates to the orientation of thermoplastic polymeric film in tubular form and, specifically, to an improved process and an apparatus for use in the expansion of the tubular film to orient such film.

In U.S. patent application Ser. No. 51,629, filed Aug. 24, 1960, now U.S. Pat. No. 3,141,912, and assigned to the assignee of the present application, is disclosed a continuous process for extruding, quenching and thereafter orienting a thermoplastic polymeric film. Specifically, the continuous process disclosed involves extruding the molten polymer in the form of a tubular sheet; passing the extruded tubular sheet into a quenching zone wherein the sheet is cooled rapidly to a temperature below its formative state; passing a gas into the tubular sheet at a rate sufficient to maintain a pressure within the tubular sheet that prevents collapse while the sheet is relatively cool but that expands the tubular sheet when the sheet is heated to a temperature within the orientation temperature range; and then passing the tubular sheet into a zone wherein the sheet is heated to a temperature range whereby the tubular sheet is expanded and thus oriented.

One problem that is apparent in such a process is to prevent the molten tubular sheet, immediately upon extrusion, from being blown away from the quenching apparatus with resulting "blow-outs" or breaks in the continuous tubular sheet. Specifically, the object of the present invention is to provide means for isolating the pressure used for expanding the tubular film when the temperature of the tubular film is within the orientation temperature range from the zone in which the film is still substantially molten, i.e., the film is not form-stable. Other objects will appear hereinafter.

The objects are accomplished by using an expandable cylindrical collar in combination with a pressure relief outlet, the collar being located between the expansion area and the beginning of the quenching area and the pressure relief outlet being located between the resilient collar and the beginning of the quenching area. The invention will be more clearly understood by referring to the following detailed description and the drawing, in which.

Figure 1:
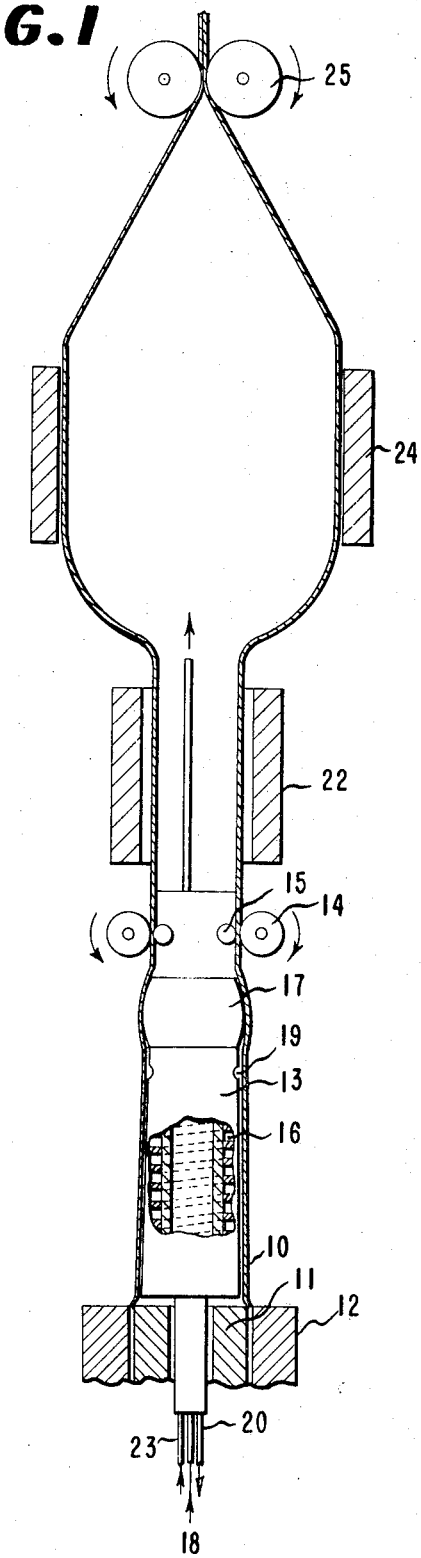
FIG. 1 illustrates schematically in elevation the apparatus for extruding, quenching, heating and expanding the tubular film.

Referring to FIG. 1, a polymeric melt issues continuously from the annular die opening (formed between core 11 and lip member 12 of the circular die) as a tubular film 10 and is cooled to a from-stable state by passage over and in contact with internal cooling mandrel 13 of circular cross section. Mandrel 13 is supplied with internal coils or helical passages 16 for the circulation therethrough of coolant. The cooling mandrel 13, preferably fabricated of a highly thermally conductive metal, may be tapered to reduce its cross section in the direction of film advance in order to reduce drag forces occasioned by neck-in and shrinkage of the polymeric tube as it cools. Tubular film 10 is advanced over mandrel 13 by the pull generated at the nips of the film advancer shown as a pair of driven, preferably rubber covered, rolls 14 external to tubular film 10, each of which bears a tangential rolling contact against a cooperating metal idler roll 15 optionally rubber covered and conveniently mounted on an extension of cooling mandrel 13.

Film advancement over the cooling mandrel may be accomplished effectively by a variety of functionally equivalent means including 1. the use of four driven rubber covered rolls 14 spaced about mandrel 13 in a square configuration, each cooperating with its respective idler roll 15; or
2. the use of two or more driven rubber covered rolls 14 pressing tubular film 10 directly against the surface of mandrel 13; or
3. the use of three or more driven rubber covered belts external to tubular film 10, each cooperating with a train of idler rolls mounted on an extension of the mandrel as described in U.S. Pat. No. 3,022,928.

Figure 2:
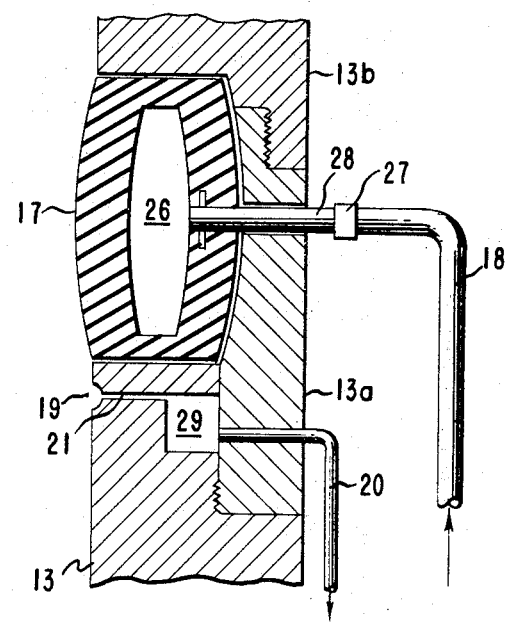
FIG. 2 is a side elevation of one type of a deformable collar for use in the present invention.
Figure 3:
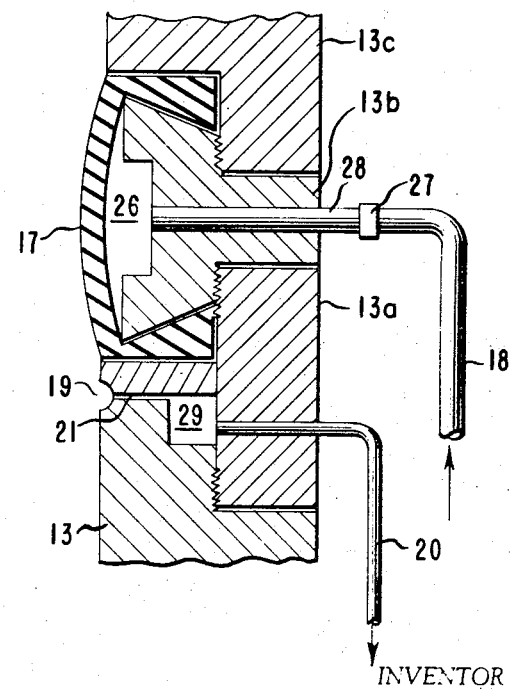
FIG. 3 is a side elevation of another type of the deformable collar for use in the present invention.

Rubber collar 17, shown here as partially distended by gaseous pressure supplied through pressure supply line 18, may be substantially tubular as in FIG. 2 or it may be an annular ring of resiliently, deformable material which cooperates with an annular extension of the mandrel to provide a substantially tubular combination as in FIG. 3. In either case, collar 17 makes peripheral contact with the inside surface of the advancing tubular film 10 and cooperates with the annular pressure relief groove 19, connected to exhaust line 20 by a series of radially extending holes 21, to effectively isolate the weak polymeric melt in the vicinity of the die face from bubble blowing pressures existing downstream from collar 17. Line 20 may be connected to vacuum system or may optionally lead to the atmosphere.

Tubular film 10, by passage through concentrically positioned cylindrical heater 22 is heated to a temperature in the orientation temperature range, i.e., in the formative state but below its melting temperature range, where, in response to internal gaseous pressure supplied through line 23, it expands until it comes in contact with concentrically positioned quench ring 24, supplied with internal helical passages (not shown) for the circulation therethrough of coolant. Passage through quench ring 24 serves to cool the expanded tubular film 10 to a temperature at which it is again form-stable. The film 10 is then collapsed to a flat tube by bubble-closing, counter-rotating nip rolls 25, from which it is optionally drawn off and wound up as flat tubing or may be slit at both creases and wound up as separate flat plies of film.

Although not shown in FIG. 1, a heater concentrically positioned within tubular film 10 and mounted on a thermally isolated extension of mandrel 13 may be used effectively, either alone or in cooperation with external heater 22 to reheat tubular film 10. This is shown in application Ser. No. 51,629, referred to previously.

If biaxial orientation of tubular film 10 is intended, nip rolls 25 counter-rotate at a lineal speed greater than the nip rolls of the film advancer. However, if it is not desired to impart longitudinal elongation to the tubular film, then may counter-rotate at the same lineal speed as the rolls of the film advancer. As a matter of fact, nip rolls 25 may, in the absence of film advancing rolls 14 and 15, act alone to provide advancement of the tubular film from the casting die.

In FIG. 2, rubber collar 17 (shown here partially distended by internal pressure) is a specially molded tube which encloses ring-shaped chamber 26 and fits into an encircling recess formed in the mandrel by the contouring of mandrel 13 and mandrel extensions 13a and 13b, each in turn being threaded into the next. Fluid (preferably gas) for the expansion of collar 17 is supplied through pressure supply line 18 which is connected via nipple 27 to stem 28, itself molded integrally with collar 17 and passing through a close fitting hole in mandrel extension 13a. A series of radially extending holes 21 connect annular pressure relief groove 19 to circular manifold 29 which is, in turn, connected to exhaust line 20.

In FIG. 3, rubber collar 17 forms an encircling portion of ring-shaped chamber 26, the remainder of said chamber being completed by circular mandrel extension 13b, threaded onto mandrel extension 13a and into which mandrel extension 13c is threaded. The four mandrel components together form two throttled annular recesses which serve to hold specially molded rubber collar 17 in place as gaseous pressure is supplied to chamber 26 through pressure supply line 18, connected via nipple 27 to stem 28, itself integral with mandrel extension 13b.

Referring now to the specific embodiments of this invention detailed in FIGS. 2 and 3, by application of air pressure through supply line 18, rubber collar 17 may be expanded until it makes effective peripheral contact with tubular film 10 passing thereover. By either manual or suitable automatic means, chamber 26 may be additionally pressured in response to an increase in gaseous pressure in the bubble blowing zone downstream from mandrel 13. If control is to be effected manually, an operator may react to readings on an indicating gauge connected to a bubble pressure sensing line. If control is to be automatic, an increase in bubble pressure above the set point of the control mechanism will bring about a proportionate increase in the gaseous pressure supplied to chamber 26 and thereby a sufficient increase in expansion of collar 17 so that its peripheral contact with tubular film 10 will insure the isolation downstream therefrom of bubble blowing pressures.

Annular pressure relief groove 19 connected to exhaust line 20 serves to backstop the operation of collar 17 to accommodate the inevitable small leakage which will occur when it is necessary to maintain peripheral contact between a resilient collar and a moving tubular film of less than perfect thickness uniformity while at the same time keeping drag forces at this point to a practical minimum.

Although the use of this invention has been illustrated in FIG. 1 which shows the polymeric melt being extruded in an upward direction in a vertically integrated process, the use of the invention is generic as well to horizontally integrated processes and to vertically integrated processes where the polymeric melt is extruded in a downward direction.

If the circular casting die is rotated to randomize gauge imperfections in the tubular film, the mandrel optionally may or may not be rotated with the die. In any situation where the mandrel is rotated and an initial rate of film advancement is provided, two or four idler rolls 15 may be conveniently mounted on a sleeve encircling the mandrel and within which the mandrel is free to rotate by virtue of an array of ball-bearings, the sleeve being held stationary by the pressure of driven rubber covered rolls 14 against idler rolls 15.

Rubber collar 17 and annular pressure relief groove 19 are shown in FIG. 1 as being located intermediate between the circular die and the film advancer. This is the preferred location for these two components of the invention from the standpoint of convenience in the design of the process equipment. However, the collar and groove may conveniently serve their pressure isolation function if located on an extension of the mandrel downstream from the film advancer.

A wide variety of thermoplastic polymers have been successfully manufactured in the form of tubular films on equipment employing some variation of the invention hereinbefore described. Among these polymers may be mentioned low density branched polyethylene, high density linear polyethylene, blends of branched and linear polyethylenes, isotactic linear polpropylene, polyvinyl chloride, polyvinylidene fluoride, polyamides; copolymers of ethylene with propylene, butene-1, vinyl acetate, ethyl acrylate; linear polyesters including polyethylene terephthalate; copolymers of tetrafluoroethylene with hexafluoropropylene; copolymers of hexafluoropropylene with vinylidene fluoride; and copolymers of vinyl chloride with vinyl acetate.

Because of the many and varied applications in which films of such a wide variety of thermoplastic polymers will be employed, it is inevitable that these polymers, prior to extrusion, will be compounded and blended with an equally wide variety of modifying agents, both organic and inorganic, used singly and in combinations. These will include antioxidants, ultraviolet light screening agents, thermal stabilizers slip promoting agents, flame retardants, plasticizers (both fugitive and permanent); fillers to impart electrical conductivity, to reduce gloss, to create various color and/or opacity effects or to modify certain physical properties.

In the tubular film manufacturing processes employing this invention, the flexible collar is in continual rubbing contact with the inner film surface. Consequently it must maintain the combination of hardness, resiliency and flexibility designed into it at the time of its manufacture and deemed appropriate to meet the requirements of the specific manufacturing operation despite the continual action thereon of the aforementioned modifying agents which are unavoidably present on the surfaces of the tubular films and which will variously soften or embrittle, abrade or otherwise corrode the collar.

A wide variety of elastomers which may be suitably compounded and molded to withstand the rigors of many a specific manufacturing situation are available. Among these may be mentioned the isoprenes (both natural and synthetic), neoprene, polysulfide rubbers, butadiene/ nitrile rubbers, butadiene/styrene rubber, silicone rubbers, polyurethane rubbers such as those available commercially under the name "Adiprene"*, polyacrylate rubbers, polyisobutylene rubbers, and fluoroelastomers such as those available commercially under the name "Viton"*(*Trademarks of E. I. du Pont de Nemours and Company, Inc.).

Employing manufacturing equipment essentially as shown in FIG. 1 and rubber collars of the types shown in FIGS. 2 and 3, biaxially oriented tubular films were successfully manufactured from a variety of polymers including polyethylene terephthalate, polyvinyl chloride, linear high density polyethylene, isotactic linear polypropylene and blends of branched and linear polyethylene. A vertically downward extrusion was employed in the case of polyethylene terephthalate to minimize process thread-up difficulties occasioned by extremely low melt viscosity.

During these operations, polymers were processed at through puts ranging from 5 to 100 pounds/hour over tapered cooling mandrels ranging in nominal diameter from 2 to 5 inches at initial rates of advancement ranging from 2.5 to 15 feet/minute and with tubular blowing zone gaseous pressures ranging from 5 to 80 inches of water.

This range of gaseous blowing zone pressures within the tubular film was successfully isolated from the weak polymer melt in the immediate vicinity of the circular casting die through the combined action of subatmospheric pressure acting at the annular pressure relief groove and the peripheral contact of the flexible rubber collar with the inner surface of the advancing tubular film, maintained by distending internal gaseous pressure supplied to the collar at pressures ranging from 1 to 20 inches of water.

I claim:

1. Apparatus for producing flat film from thermoplastic material, comprising an extruder having a die through which a tube of said material can be continuously extruded, a cooling device located in the path of the extruded tube to effect cooling and setting of the tube, a heater device operable to heat the cooled and set tube to a softening temperature which will permit orientation of the molecules of the thermoplastic material, tube engaging means operable to engage the periphery of the tube between the cooling and heater devices and to move it towards the heater device, a sealing member engageable with the interior sides of the tube at a position between the cooling and heater devices to form with the tube a seal preventing the entry into the tube portion between the sealing member and the cooling device of gas contained in the tube portion between the sealing member and the heater device, means operable to introduce gas at superatmospheric pressure through said sealing member into the interior of the portion of the tube softened by said heater device, and nip rollers operable to flatten the heat-softened tube, to entrap therein gas introduced by said last-named means, and also to move the tube away from the heater device at a linear speed greater than that at which the tube is moved by said tube engaging means thereby to effect simultaneous lateral and lengthwise stretching of the heat-softened portion of the tube.

2. An apparatus comprising an extruder; a die communicating with said extruder having an annular orifice through which to extrude thermoplastic material in the form of tubing; a substantially rigid mandrel adapted to receive the tubing around said mandrel and to cool said tubing; means for advancing the tubing over said mandrel; means for supplying a gaseous medium within said tubing to a point downstream from said mandrel; means for preventing said gaseous medium from flowing upstream past said mandrel to said die, said means comprising at least one pressure relief outlet disposed on the surface of the mandrel adapted to vent gas from the interior of the tubing in combination with a pneumatically, resiliently deformable annular collar secured to and encircling said mandrel disposed adjacent to and downstream from said pressure relief outlet; means for supplying fluid medium to the inner surface of said collar sufficient to expand said collar into peripheral contact with the inner surface of said tubing.

3. An apparatus comprising an extruder; a die communicating with said extruder having an annular orifice through which to extrude thermoplastic material in the form of tubing; a substantially rigid mandrel adapted to receive the tubing around said mandrel and to cool said tubing; means for advancing the tubing over said mandrel; means for supplying a gaseous medium within said tubing to a point downstream from said mandrel; means for preventing said gaseous medium from flowing upstream past said mandrel to said die, said means comprising at least one pressure relief outlet disposed on the surface of the mandrel adapted to vent gas from the interior of the tubing in combination with a pneumatically, resiliently deformable tubular collar secured to and encircling said mandrel disposed adjacent to and downstream from said pressure relief outlet; means for supplying a fluid medium to the interior of said tubular collar sufficient to expand said collar into peripheral contact with the inner surface of said tubing.

* * * * *